(12) United States Patent
Dinsmoor

(10) Patent No.: X8470
(45) Date of Patent: Oct. 25, 1834

(54) SADDLES, RIDING

(76) Inventor: Alonzo R. Dinsmoor

United States Patent

Patent No.: X8470

Alonzo R. Dinsmoor
Letters Patent

The schedule referred to in these Letters Patent, and making part of the same, containing a description in the words of the said Alonzo R. Dinsmoor himself of his improvement in the manufacture of the common riding saddle.

---

To all to whom these presents shall come. Be it known that I, Alonzo R. Dinsmoor of Gaffstown County of Hillsborough, and State of New Hampshire, have invented a new and useful improvement in the manufacture of the common riding saddle, and that the following is a full and exact description of the parts of the said saddle as invented or improved by me.

The covering of the seat is in one entire piece and drawn on whole, and remains so without any sewing. 2d Small Jockeys which extend back to cover the stirrup loops, and are nailed on, and the nails covered with a flat moulding or ornamental nails. 3d The application of small pads in the rear of the Jockeys.

The above are claimed as improvements, and more fully represented in the model herewith transmitted.

To prepare the tree to receive these improvements, requires it to be very narrow and brought to a thin edge on the sides, the webbing brought lower than usual, and the roll omitted The advantages of saddles constructed in this manner are, that they are more durable, easier to ride upon, and by saving labor and stock consequently cheaper.

Witnesses
George Daniels
Nath^l Manning

Alonzo R. Dinsmoor

Exd.
[illegible]

(250 words)